(12) United States Patent
Schuster et al.

(10) Patent No.: US 6,193,400 B1
(45) Date of Patent: Feb. 27, 2001

(54) HEADLIGHT FOR VEHICLE IN ACCORDANCE WITH PROJECTION PRINCIPLE

(75) Inventors: Kurt Schuster, Reutlingen; Gerhard Weihing, Gomaringen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/274,841

(22) Filed: Mar. 23, 1999

(30) Foreign Application Priority Data

Apr. 1, 1998 (DE) .............................................. 198 14 480

(51) Int. Cl.[7] ...................................................... B60Q 1/00
(52) U.S. Cl. ........................... 362/538; 362/521; 362/544
(58) Field of Search ................................... 362/507, 538, 362/543, 547, 521, 299, 309, 336, 539, 248, 305

(56) References Cited

U.S. PATENT DOCUMENTS

| | | | |
|---|---|---|---|
| 4,158,222 | * 6/1979 | Cook | 362/269 |
| 4,652,979 | * 3/1987 | Arima | 362/522 |
| 4,949,226 | * 8/1990 | Makita | 362/538 |
| 5,043,856 | * 8/1991 | Levin | 362/309 |
| 5,158,350 | * 10/1992 | Sato | 362/538 |
| 5,353,204 | * 10/1994 | Kawamura | 362/538 |
| 5,927,848 | * 7/1999 | Natsume | 362/496 |

FOREIGN PATENT DOCUMENTS 32 18 703 A1   11/1983   (DE) .

* cited by examiner

*Primary Examiner*—Sandra O'Shea
*Assistant Examiner*—Hargobind S. Sawhney
(74) *Attorney, Agent, or Firm*—Michael J. Striker

(57) ABSTRACT

A headlight for a vehicle operating in accordance with a projection principle has a reflector, a light source, a lens through which a light emitted by the light source and reflected by the reflector passes, at least partially light-permeable element which at least partially surrounds the lens at least over a part of its periphery and is provided locally with optical profiles so that the light emitted by the light source and not engaged by the reflector passes through the element and is collected by the element, the light reflected by the reflector and passing through the lens forming an upper bright-dark limit, and at least one additional light source which produces a limiting light and is arranged so that the light emitted by the at least additional light source at least partially passes through the element.

7 Claims, 5 Drawing Sheets

HEADLIGHT FOR VEHICLE IN ACCORDANCE WITH PROJECTION PRINCIPLE

BACKGROUND OF THE INVENTION

The present invention relates to a headlight for vehicles operating in accordance with a projection principle.

Such a headlight is disclosed for example in the German patent document DE 32 18 703 81. The headlight has a reflector, a light source and a lens through which the light reflected by the reflector passes. Moreover, the headlight has a light-permeable element which at least partially surrounds the lens over its periphery and has optical profiles. The light emitted by the light source and not engaged by the reflector can pass through the element and can be collected. The element has prisms which form optical profiles and deviate the passing light. With this design of the element, when the light source is turned on, the illuminating surface of the headlight is increased relative to the surface of the lens, so that through the headlight no or an insignificant subjective screening is caused. The light quantity which is emitted by the light source and passed through the element is not sufficient in all conditions to provide a sufficient illumination of the element. With the turned-off light source, the element is dark and the headlight has an undesirable non-uniform appearance. In the headlights operating in accordance with the projection principle, the light emitted by it, has a sharply pronounced upper bright-dark limit which is advantageous for avoiding a blinding of the countertraffic. However, it has the disadvantage that the objects which are arranged high, such as for example traffic boards or information boards are not illuminated or at least not sufficiently illuminated.

SUMMARY OF THE INVENTION

Accordingly, it is an object of the present invention to provide a headlight for a vehicle which avoids the disadvantages of the prior art.

In keeping with these objects and with others which will become apparent herein after, one feature of present invention resides, briefly stated in a headlight for a vehicle, in which the headlight has at least one additional light source for producing a limiting light which is arranged so that the light emitted by it at least partially passes through the element.

When the headlight is designed in accordance with the present invention, it has the advantage that by utilization of light emitted by the additional light source which serves for producing a limiting light, the illumination of the element is improved.

In accordance with another feature of the present invention, the optical profiles of the element are ring-shaped so as to form at least one Fresnel lens. In such a construction, the light emitted by the light source and the additional light source can be collected with a high efficiency.

In accordance with still a further feature of the present invention, at least a partially reflecting layer is arranged in a part of the beam path of the light passing through the element, and faces in a light outlet direction. With this construction, the headlight in the turned-on condition has a brilliant appearance.

In accordance with still a further feature of the present invention, further optical profiles are arranged at least in a part of the beam path of the light passing through the element, so that the light is deviated through the further optical profiles, reflected a region in front of the vehicle above the bright-dark limit of the reflector, and eliminate the light passing through the lens. With these features, a sufficient illumination above the bright-dark limit is provided.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
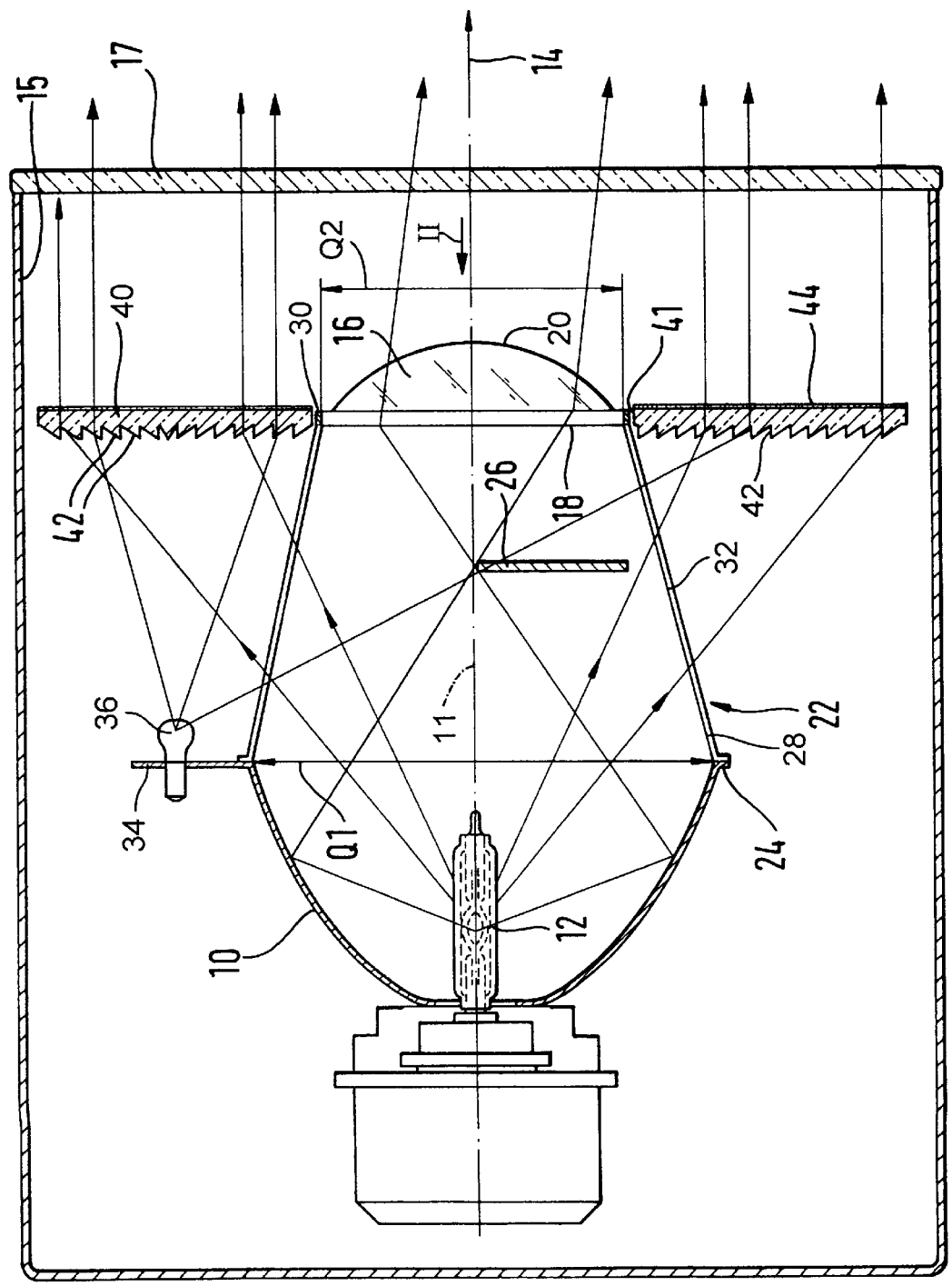
FIG. 1 is a view a headlight in a vertical longitudinal section in accordance with the first embodiment of the present invention.

A headlight in accordance with the present invention shown in FIGS. 1–5 is used for vehicles, in particular motor vehicles. It operates in accordance with a projection principle and serves for producing at least one dim light. The headlight has a reflector 10 which can be composed of synthetic plastic or metal, and a light source 12 arranged in an apex region of the reflector. The light source 12 can be formed as an incandescent lamp, a gas discharge lamp, or another suitable lamp.

A lens 16 composed of glass or synthetic plastic is arranged after the reflector 10 as considered in a light outlet direction 14. The lens 16 has for example a flat side 18 which faces the reflector 10 and an opposite convexly curved side 20. The lens 16 is held in a support element 22 and is connected with a front edge 24 of the reflector 10 which faces in a light outlet direction 14. A reflector 10 and the lens 16 can be arranged in a housing 15 which has a light outlet opening. The light outlet opening can be covered with a light-permeable disk 17 of glass or synthetic plastic. A cover disk 17 can be smooth, so that the light can pass through it without being influenced. Alternatively, it can be provided at least locally with optical elements, in which the passing light is deviated, for example dispersed.

The light emitted by the light source 12 is reflected by the reflector 10 as a converging light beam. It passes through the lens 16 and therefore is deviated. The lens 16 operates as a collecting lens, and the light which passes through it is refracted to the optical axis 11 of the reflector 10. The reflector 10 can have for example at least approximately ellipsoidal form, an ellipsoid-like form or a numerically determined form produced from the characteristic of the light bundle to be reflected by the reflector 10. The light permeable screen 26 can be arranged between the reflector 10 and the lens 16. It can be arranged substantially under the optical axis 11, and only a part of the light bundle reflected by the reflector 10 can pass on it. On the light bundle passing over the screen 26, a bright-dark limit determined by the upper edge of the screen 26 is produced. It projects through the lens 16 the dim light bundle exiting the headlight as the bright-dark limits. Alternatively, the screen 26 can be displaced with when the shape of the reflector 10 is selected so that the light bundle reflected by it already has a required bright-light limit which is formed by the lens 16.

The reflector 10 at its front edge 24 has a cross-section Q1 and the lens 16 has a cross-section Q2 which is smaller than the cross-section Q1. The supporting element 22 can have one or several webs 28 which extend from the front edge 24 of the reflector 10 to the vicinity of the lens 16. There they can be connected with one another by a ring-shaped portion 30 which the lens 16 is held with its edge. Openings 32 which remain between the webs 26, and the light emitted by the light source 12 and not engaged by the reflector 10 can pass through the openings. The webs 28 are formed as small as possible to provide great openings 32 there between so that the corresponding greater part of the light emitted by the light source 12 can pass through them. Alternatively, the support element 22 can be composed of partially light-permeable material, such as synthetic plastic or glass so that the light emitted by the light source 12 can pass through it. In this case, the support element 22 does not have any openings.

The reflector 10 at its front edge 24 which faces in the light outlet direction 14 is provided with an edge region 34 extending transversely to the light outlet direction 14. It can be formed of one piece with the reflector 10 or as a separate part which is connected with the reflector 10. The edge region 34 can be also connected with the support element 22 of the lens 16 or formed of one piece with it. The edge region 34 can be arranged near the reflector 10 in the lateral direction or above or below the reflector 10. In the shown embodiments, the region 34 is arranged upon the reflector 10.

An additional light source 36 is inserted in the edge region 34. It serves for producing a legally prescribed limiting light. By the limiting light, the vehicle contours are marked and these are legally prescribed required illumination intensities and the visibility in different directions. The edge region 34 can be formed reflecting as reflector 10, and can have a flat or concavely curved shape to reflect the light emitted by the light additional light source 36 in the light outlet direction 14. It can be however also provided that the edge region 34 is not reflecting. For producing of the limiting light only the direct light emitted by the additional light source 36 can be used in this case. The additional light 36 can be formed as an incandescent lamp, for example of type W5W or H6W, or a lamp of another type.

Figure 2:
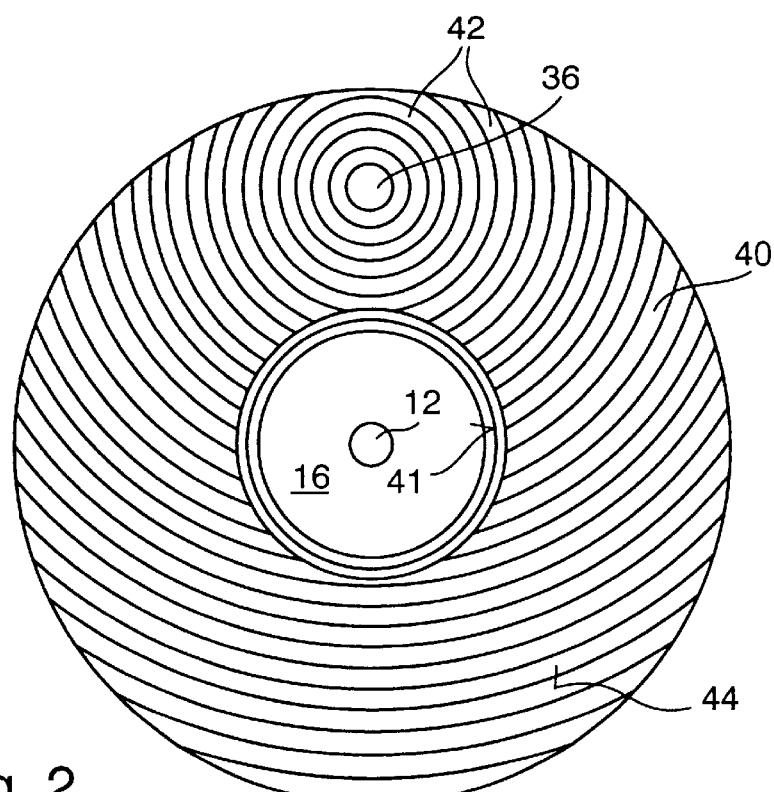
FIG. 2 is a view showing the inventive headlight in direction of an arrow 2 in FIG. 1.

At least one element 40 is further provided. It surrounds the lens 16 at least over a part of its periphery as shown in FIGS. 1 and 2 in accordance with a first embodiment. The element 40 surrounds the lens 16 over its whole periphery and is composed of light-permeable material, such as for example glass or synthetic plastic. The element 40 in its central region has an opening 41 in which the lens 16 is arranged. The lens 16 and the element 40 can be formed of one piece with one another. The element 40 at least locally preferably over its whole extension, is formed as a Fresnel lens and has several concentric ring-shaped optical profiles 42. The optical profiles 42, as shown in FIGS. 1 and 2 are arranged at the side of the element 40 which faces opposite-to the light outlet direction 14, or at the side of the element 40 which faces in the light outlet direction 14. The optical profiles 42 can be for example wedge-shaped. The light passing through the element 40 can be deviated by them toward the optical axis 11 and therefore collected. The element 40 is arranged so that the light emitted by the light source 12 and not engaged with the reflector 10 and the light emitted by the additional light source 36 can pass through it. The optical profiles 42 can be for example formed so that the light emitted by the light sources 12 and 36 after the passage through them extends substantially parallel to the optical axis 11. In the first embodiment the ring-shaped optical profiles 42, as shown in FIG. 2, are arranged in the element 40 substantially concentrically to the further light source 36 and extend over the whole element 40. The element 40 for example has a round shape, while the shape of the element 40 can be of course selected to be arbitrary, for example oval, rounded or cornered, depending on what view of the headlight must be provided. It can be also provided that the element 40 surrounds the lens 16 only over a part of its periphery, and for example only laterally near the lens 16 or can be arranged only above and/or below the lens 16.

The element 40 can be arranged as shown in FIG. 1 so that it has substantially the same distance from the reflector 10 in direction of the optical axis 11 as the lens 16. Alternatively, the element 40 can have another distance from the reflector 10 in direction of the optical axis 11 than the lens 16 and therefore arranged with offset relative to the lens 16. The element 40 can be formed flat as shown in FIGS. 1–5 or alternatively can be convexly or concavely curved. The light emitted by both light sources 12 and 36 pass through the element 40, so that a sufficient illumination of the element 40 is provided.

In accordance with a further embodiment of the headlight, at least partially reflecting layer 44 is arranged at least in a part of the beam path of the light passing through the element 40. In the first embodiment of the headlight shown in FIGS. 1 and 2, the layer is formed as a coating 44 which is applied at least locally on the side of the element 40 facing in a light outlet direction 14. The coating 44 can be formed so that it is light-non permeable, and it is arranged only locally on the element 40 to make possible a partial passage of the light emitted by the lights 12 and 36. The coating 44 can be formed by lines or rings. Alternatively, the coating 44 can be formed so that it is partially light-permeable and partially reflecting. In this case the whole surface of the element 40 is covered by the coating 44 or only a part of its surface.

The light emitted by the light sources 12 and 36 can pass partially through the coating 44, while the light impinging outside on the coating 44 is partially reflected. The coating 44 is composed preferably of metal, such as for example aluminum and can be applied by known methods on the element 40 for example by evaporating, sputtering, varnishing, printing or impregnating. The light-permeability of the coating 44 can be varied by its thickness, and the light permeability reduces with increased thickness. In order to obtain a partial light permeability of the coating 44, it must have a small thickness, while for producing a high reflection intensity it must have a greater thickness. The coating 44 allows a partial passage of the light emitted by the light sources 12 and 36 through the element 40 when the headlight is turned on, while when the headlight is turned-off, the light falling from outside is at least partially reflected by the coating 44 and the headlight in the region of element 40 has a brilliant appearance.

Figure 3:
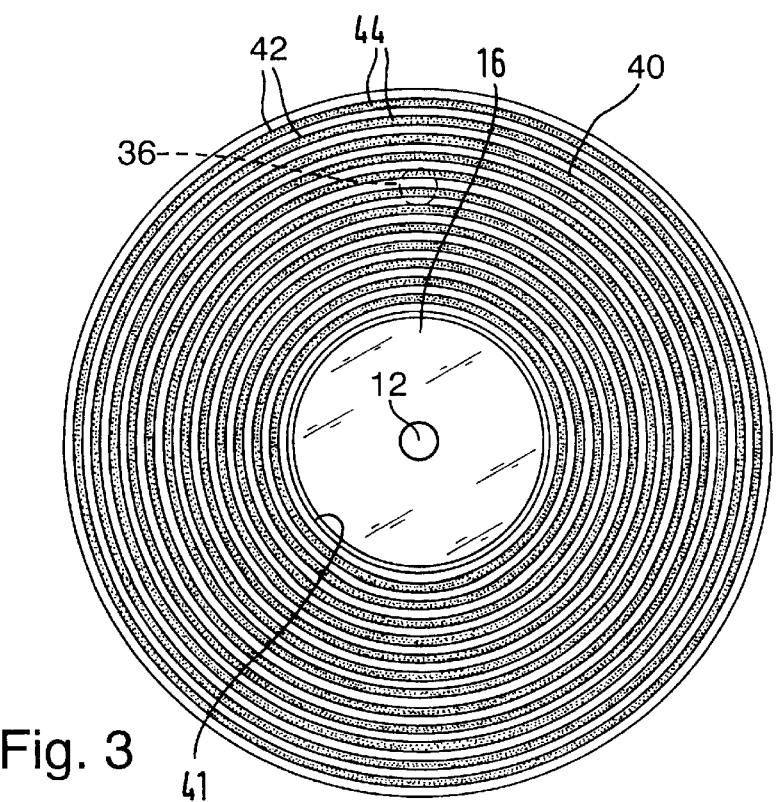
FIG. 3 is a view showing a headlight in a view in the direction of the arrow 2 in FIG. 1, in accordance with a modified embodiment.

FIG. 3 shows a headlight with an embodiment which is modified with regard to the embodiment of FIGS. 1 and 2, while the basic construction of the headlight is the same as in the first embodiment. In the modified embodiment, the arrangement of the optical profiles 42 which form the Fresnel lens is different from the first embodiment. In particular, they extend ring-shaped at least approximately concentrically to the optical axis 11 of the reflector 10. The ring-shaped optical profiles 42 for forming the Fresnel lens in deviation from the first embodiment shown in FIG. 2 in the modified embodiment shown in FIG. 3 can have other shapes as well.

Figure 4:
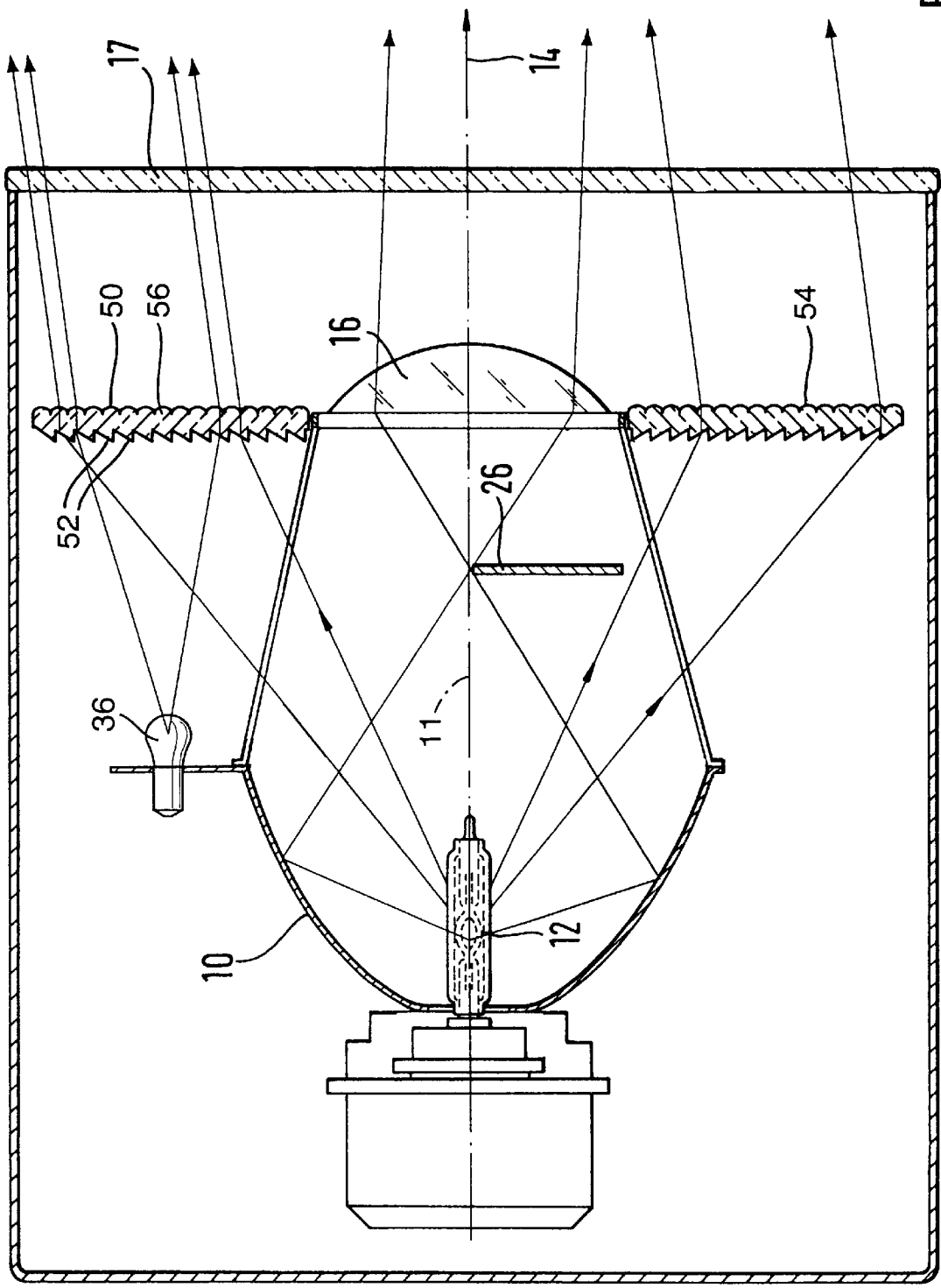
FIG. 4 is a view showing a headlight in a vertical longitudinal section, in accordance with a second embodiment.

A further construction of the headlight in accordance with a second embodiment as shown in FIG. 4. It substantially corresponds to the construction of the reflector 10, the light source 12, the lens 16 and the screen 26 which is the same as in the first embodiment. In addition, a further optical profile 56 are arranged at least in a part of the beam course of the light passing through the element 50. The light is deviated upwardly by them. The further optical profile 56 are arranged on the side of the element 50 which faces in the light outlet direction 14. At the side of the element 50 which is opposite to the light outlet direction 14, ring shaped optical profiles 52 which form the Fresnel lens are arranged. The further optical profiles 56 can be formed as lenses which extend substantially horizontally, at one side, and at the first light upwardly.

Figure 6:
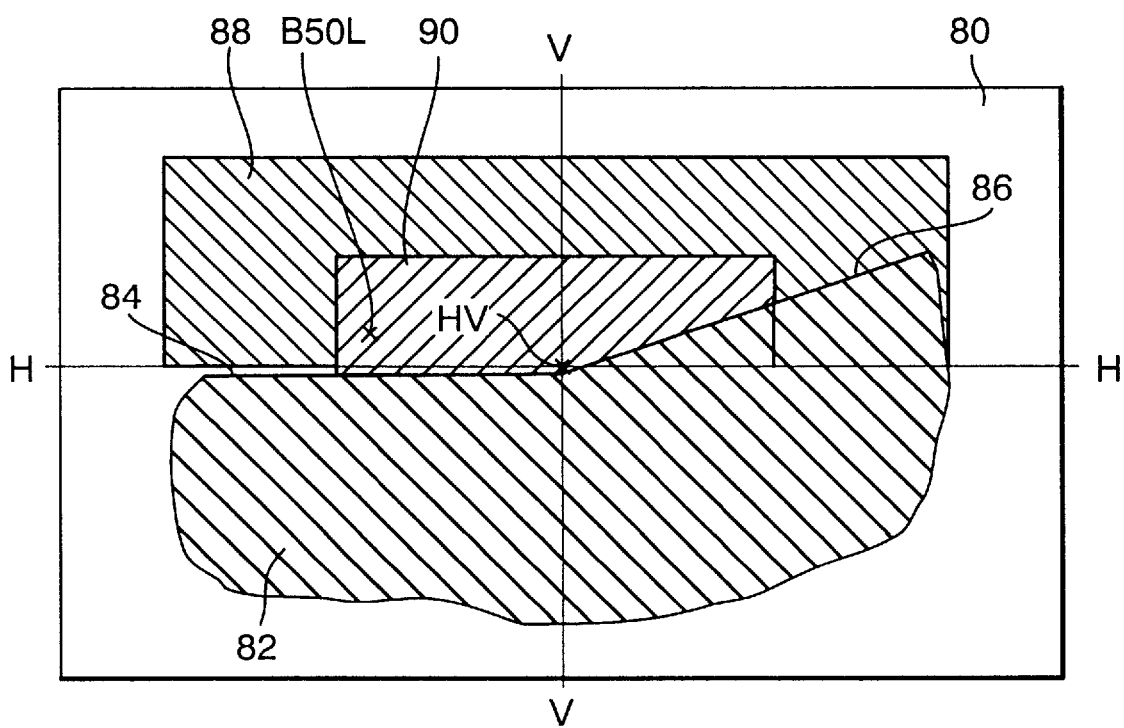
FIG. 6 is a view showing a measuring screen arranged in front of the headlight for illumination by a light emitted by the headlight.

A measuring screen 80 is arranged in FIG. 6 at a distance in front of the headlight and is illuminated by the light emitted by the headlight. Horizontal central plane of the measuring screen 80 is identified as HH and the vertical central screen is identified as VV. The horizontal central plane HH and the vertical central plane VV intersect one another in a point HV. The light which is emitted by the light source 12 reflected by the reflector 10 and separated on the screen 26 by the lens 16 illuminates the measuring screen 80 in a region 82. The region 82 is limited from above by a dark-light limit produced by the screen 26. The shown embodiment, the headlight is determined for the right traffic and the bright-dark limit has on the counter traffic side, or at the left side of the measuring screen 80 a portion 84 which extends substantially horizontally under the horizontal central plane HH. At the traffic side, or in other words at the right side of the measuring screen 80, the bright-dark limit has a raising portion 86 which extends from the horizontal portion 84 to the right edge of the measuring screen 8 or the horizontal central plane HH outwardly. Alternatively, the bright-dark limit at the traffic side can have a portion which is arranged higher than the portion 84 and is also horizontal. The distribution of the illumination intensities in the region 82 is provided by legal considerations, and in a zone under the point HH the highest illumination intensities are available. The measuring screen 80 above the bright-dark limit 84, 86 is not reflected or poorly reflected by the light reflected by the reflector 10 and passing over the screen 26 by the lens 16.

The light passing through the element 50 and reflected upwardly by the further optical profiles 56 illuminates the measuring screen 80 in a region 88 arranged at a distance above the bright-dark limit 84, 86. The light passing through the element 50 provides in the region 88 such an illumination which maintains the legal prescription with respect to an average illumination intensity values and maximum illumination intensity values. For example, in view of acting ECE regulation 20 defines a measuring point of B50L, in which the illumination intensities amounts maximum to 0.4 lux, to avoid a blinding of the counter traffic. With consideration of the legal prescription, the illumination intensity distribution in the region 80 can be selected freely. The illumination intensity distribution can be selected for example so that in a region 90 located directly above the bright-dark limit 84, 86 on the measuring screen 80, which extends for example up to approximately 2° above the horizontal central plane HH and under substantially 4° at both sides of the vertical central plane VV, the light passing through the element 40 illuminates only poorly. The falling region 88 which is located above and laterally over the region 90 extends for example vertically above up to 4° over the horizontal central plane HH and laterally at both sides of the vertical central plane VV up to substantially 80° and is stronger eliminated in the region 90.

When in accordance with the preceding embodiment the headlight in the second embodiment is provided with a further optical profiles 56 as well as at least partially reflecting coating 44, they can be applied for example on the surfaces of the further optical profiles 56 facing in the light outlet direction 14.

Figure 5:
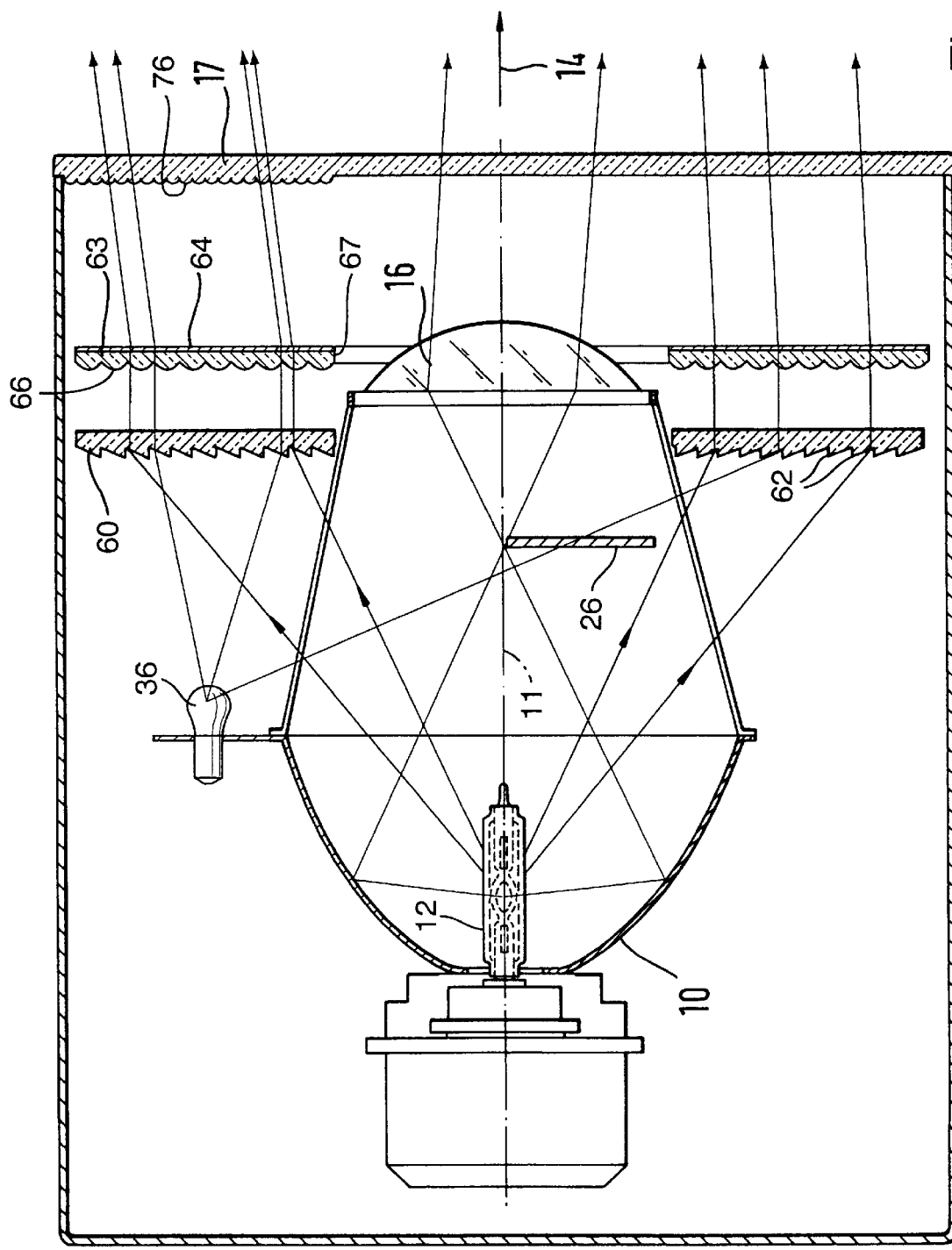
FIG. 5 is a view showing a headlight in a vertical longitudinal section in accordance with a modified embodiment.

In FIG. 5 the headlight is shown in accordance with an embodiment which is modified with regard to the second embodiment shown in FIG. 4. In the modified embodiment of FIG. 5, a disk 63 is provided at least in a part of the beam path of the light passing through the element 60. At least locally optical profiles 66 are arranged on the disk 63. They deviate upwardly the light which passes through the further vertical profiles 56 of the element 50 so that it illuminates the region 88 of the measuring screen 80. The optical profiles 66 can be provided on the side of the disk 63 which faces in the light outlet direction 14 or on the side faces opposite to the light outlet direction.

The element 60 needs then only the optical profile 62 for forming the Fresnel lens. They can be arranged at a side of the element 60 which faces in the light outlet direction 14 or at the side facing away from the light outlet direction. A coating 64 can be applied at a side of the disk 63 which faces in the light outlet direction 14. It can be formed as the coating 44 described in the first embodiment. The disk 63 in its central region is provided with an opening 66, through which the light passing through the lens 16 can pass without being affected. Alternatively, the disk 63 can also extend over the beam path of the light which passes through the lens 16, and the disk 33 in this region however has no optical profiles 66.

In accordance with a further modified embodiment of the headlight, the optical profiles 76 which deviate upwardly the light passing through the element 40 or 60 for illumination of the region 88 of the measuring screen 80, are arranged on the cover disk 17 of the headlight. The disk 63 can be dispensed with and the element 40 or 60 can have only optical profiles 42 or 62 for forming the Fresnel lens. The optical profiles 76 are arranged only in the region of the cover disk 17, so that no light passing through the lens 16 can pass through them.

It will be understood that each of the elements described above, or two or more together, may also find a useful application in other types of constructions differing from the types described above.

While the invention has been illustrated and described as embodied in headlight for vehicle in accordance with projection principle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A vehicle projection-type headlight, comprising a reflector; a light source; a lens passing the light emitted by said light source and reflected by said reflector in the light direction of the headlight; at least one light-permeable element which surrounds said lens at least over a part of its periphery and is provided locally with first optical profiles formed on a surface of said light-permeable element, which faces said light source, so that the light emitted by said light source and not engaged by said reflector passes through and is collected by said light-permeable element, the light reflected by said reflector and passing through said lens forming an upper bright-dark limit; and at least one additional light source arranged externally of said reflector within a headlight housing and with its axis substantially parallel to the axis of the light outlet direction of the headlight and operating as a side-marker light so that the light emitted by said at least one additional light source passes partially through said light permeable element substantially in the light outlet direction of the headlight.

2. A headlight as defined in claim 1; and further comprising an edge region extending transversely to a light outlet direction over a front edge of said reflector facing in the light outlet direction, said additional light source being arranged on said edge region.

3. A headlight as defined in claim 1, wherein said first optical profiles of said light permeable element are ring shaped so as to form at least one Fresnel lens.

4. A headlight as defined in claim 3, wherein said ring shaped optical profiles are formed on said light-permeable element at least approximately concentrically to said at least one additional light source.

5. A headlight as defined in claim 3, wherein said ring-shaped optical profiles are formed on said light-permeable element at least approximately concentrically to said light source.

6. A headlight as defined in claim 1; and further comprising at least partially reflecting layer on said light-permeable element which is arranged at least in a part of a beam path of the light passing through said light permeable element and faces in the light outlet direction.

7. A headlight as defined in claim 1; and further comprising further optical profiles on said light-permeable element arranged at least in a part of a beam path of the light passing through the element so as to deviate passing light so that it is at least reflected in a region above the bright-dark limit of said reflector.

* * * * *